Patented June 18, 1935

2,005,156

UNITED STATES PATENT OFFICE 2,005,156

DETERMINING COPPER IN COPPER COATED WIRE AND THE LIKE

Walter Frederick Muehlberg, Cleveland, Ohio

No Drawing. Application March 14, 1933, Serial No. 660,777

5 Claims. (Cl. 23—230)

Copper coated wire of steel (in which term iron is included) is generally applied either by hot dipping or by electrolytic deposition. The thickness of copper is comparatively slight. For example, rubber covered wire is made of a steel wire with a thin coating of copper which facilitates the adherence of the rubber. In such products a certain weight of copper is specified per unit weight of wire. This has been previously determined by an electrolytic deposition method which is slow and requires expensive apparatus and expert knowledge.

By experiment I have discovered another method, which is simple, rapid and accurate, and can be easily applied to the checking of the weight of the copper coating during the applying of it. The new method has proven quite as accurate as the electro-deposition method and requires less expensive apparatus and less previous knowledge.

The improved process involves the use of a neutral silver nitrate solution for stripping the copper from the wire and the determination of the amount of copper in the coating; as for example, by a direct, gravimetric or an indirect, colorometric method.

Specific examples are the following:—

*Gravimetric method.*—Cut a number of pieces from the wire to be tested, just long enough to rest freely on the bottom of a 250 milliliter beaker without touching the sides. Select a catch weight of these wires weighing between 4.9 and 5.1 grams and then weigh accurately. Transfer the wires to the 250 milliliter beaker, add 20 milliliters of the silver nitrate solution and agitate for thirty seconds. With the aid of a stream of distilled water from a wash bottle, wash the wires three times by decantation, add 20 milliliters of 95% alcohol, agitate for a few seconds, decant the alcohol, remove the wires to a clean piece of paper and place on a hot plate at a temperature of about 105 degrees centigrade (221 degrees Fahrenheit). When dry, wipe the wires with a clean cloth and weigh accurately. The difference in weight, divided by the weight of the sample used, multiplied by 100 will be the percentage of copper on the wire; each 0.1% being 1 gram of copper per kilo of wire.

*Colorometric method.*—Transfer one gram of the wire to be tested to a 250 milliliter beaker, add 10 milliliters of the silver nitrate solution, agitate for thirty seconds, add 10 milliliters of distilled water, agitate for several seconds, add ammonia (specific gravity 0.90) a drop at a time until the solution becomes blue and smells distinctly of ammonia, agitate again for a few seconds and filter into a tall form, 100 milliliter Nessler tube. Transfer the residue of metallic silver to the filter with the aid of a stream of distilled water from a wash bottle and wash on the filter until the solution rises in the tube to the 50 milliliter mark. Remove the funnel and mix the solution in the tube with a glass rod or plunger.

Fill a similar Nessler tube to within a few milliliters of the 50 milliliter mark with distilled water, carefully add small amounts of copper standard solution from a burette, stir and compare the color of the solution with the sample after each addition, looking down through the solutions against a white surface. A colorimeter with an opal glass reflector is preferable. When the colors almost match, adjust the solutions to the same volume with distilled water and carefully add the standard copper solution a drop at a time with intermediate mixings. When the colors of the two solutions match exactly, each milliliter of the standard copper solution used will represent 0.1% of copper on the sample or one gram of copper per kilo of wire. If more than one sample are to be run at a time, or if determinations are to be made at short intervals throughout the day, time can be saved by having a number of Nessler tubes prepared containing amounts of copper which differ from each other by 0.0005 gram.

The silver nitrate solution may be made by dissolving 30 grams of chemically pure silver nitrate in one liter of distilled water, or one ounce in one quart and mixing. The standard copper solution can be made by dissolving one gram of pure copper in 15 milliliters of 1—1 nitric acid (specific gravity 121), diluting to about 100 milliliters, adding ammonia until the blue color develops and the solution smells distinctly of ammonia, and further diluting to exactly one liter and mixing. One milliliter of this solution equals 0.0010 gram of copper. The alcohol referred to is 95 per cent grain alcohol; the ammonia, chemically pure of 0.90 specific gravity.

The method is particularly adapted for controlling the coating during the production of the coated wire or the like. The time consumed in either the gravimetric or the colorometric method, including the weighing of the samples, is under ten minutes. The accuracy of the method is plus or minus 0.2 gram of copper per kilo of wire for the gravimetric method and plus or minus 0.3 gram of copper per kilo of wire for the colorometric method. The percentage of error in the method itself is probably less than the difference in percentages of copper actually present on two different samples of wire taken from different parts of the same bundle.

The process is economical, as stated above. Also the cost of reagents for each determination is under two cents for the gravimetric method and under one cent for the colorometric method. The silver may be recovered, and the alcohol may be used a number of times.

Silver nitrate solution is used in a neutral condition,—that is to say, substantially free from acid or alkali—to prevent the solution of the steel on which the copper is plated.

Having now particularly described and ascertained the nature of my said invention and in what manner the same is to be performed, I declare that what I claim is:—

1. The method of determining the amount of copper on thinly coated steel wire which includes immersing the wire in a neutral silver nitrate solution, agitating the solution for approximately thirty seconds, and calculating the amount of the coating from the copper removed by the solution.

2. The method of determining the amount of copper on thinly coated steel wire which includes immersing the wire in a neutral silver nitrate solution, agitating the solution for approximately thirty seconds, and calculating the amount of the coating from a color comparison of the copper removed by the solution.

3. The method of determining the amount of copper on thinly coated steel wire which includes immersing the wire in a neutral silver nitrate solution, agitating the solution for approximately thirty seconds, and calculating the amount of the coating from the difference in weight of the wire after the copper has been removed by the neutral silver nitrate solution.

4. The method of determining the amount of copper on thinly coated steel wire which includes weighing the same, immersing the wire in a neutral silver nitrate solution, agitating the solution for approximately 30 seconds, washing the wire at least once by decantation, immersing the washed wire in an approximate 95 per cent solution of alcohol, agitating the alcohol, decanting the alcohol, drying and cleaning the wire, weighing the dried and cleaned wire, and calculating the amount of the coating from the copper removed.

5. The method of determining the amount of copper on thinly coated steel wire which includes immersing the same in a silver nitrate solution, agitating the solution for approximately 30 seconds, adding distilled water, further agitating the silver nitrate solution and the distilled water, adding ammonia a drop at a time until the solution becomes blue and smells distinctly of ammonia, said ammonia being of approximately 0.90 specific gravity, agitating the silver nitrate solution, distilled water and ammonia and filtering the same, transferring the residue of metallic silver and obtaining a sample of the solution, and calculating the amount of the coating from a color comparison of the copper removed by the solution with a standard copper solution.

WALTER FREDERICK MUEHLBERG